US012654540B2

(12) United States Patent
Van Iersel et al.

(10) Patent No.: US 12,654,540 B2
(45) Date of Patent: Jun. 16, 2026

(54) WHEEL ASSEMBLY, VEHICLE, AND METHOD OF ASSEMBLING

(71) Applicant: LIGHTYEAR IPCO B.V., Helmond (NL)

(72) Inventors: Dennis Adrianus Petrus Van Iersel, Nuenen (NL); Tim Johannes Jacqueline Jansen, Nuenen (NL); Wouter Lucas Jansen, Eindhoven (NL)

(73) Assignee: Lightyear IPCo B.V., Helmond (NL)

( * ) Notice: Subject to any disclaimer, the term of this patent is extended or adjusted under 35 U.S.C. 154(b) by 295 days.

(21) Appl. No.: 17/796,889

(22) PCT Filed: Feb. 1, 2021

(86) PCT No.: PCT/EP2021/052265
§ 371 (c)(1),
(2) Date: Aug. 2, 2022

(87) PCT Pub. No.: WO2021/156182
PCT Pub. Date: Aug. 12, 2021

(65) Prior Publication Data
US 2023/0053415 A1 Feb. 23, 2023

(30) Foreign Application Priority Data
Feb. 5, 2020 (NL) ..................................... 2024835

(51) Int. Cl.
*B60K 7/00* (2006.01)
*H02K 7/08* (2006.01)
(52) U.S. Cl.
CPC ........... *B60K 7/0007* (2013.01); *H02K 7/088* (2013.01)

(58) Field of Classification Search
CPC .. B60K 7/0007; H02K 7/088; B60Y 2200/12; B60L 2220/44; B60L 2220/46; B62B 5/004; B60B 27/0005
See application file for complete search history.

(56) References Cited

U.S. PATENT DOCUMENTS 4,913,258 A * 4/1990 Sakurai .................. B60K 17/30
180/242
6,811,011 B2 * 11/2004 Bastien ................ F16J 15/3456
192/112

(Continued)

FOREIGN PATENT DOCUMENTS

CN 109412326 A * 3/2019 ............. H02K 7/006
DE 102008004085 A1 * 7/2009 ........... B60K 7/0007

(Continued)

OTHER PUBLICATIONS

Translated WO-2013047695-A1 (Year: 2024).*

(Continued)

*Primary Examiner* — James A Shriver, II
*Assistant Examiner* — Ian Bryce Shelton
(74) *Attorney, Agent, or Firm* — Patterson + Sheridan, LLP

(57) ABSTRACT

There is provided a wheel assembly for a vehicle. The wheel assembly comprises an in-wheel motor, an axle, a first wheel bearing, and a lock nut. The in-wheel motor comprises a stator, a rotor and electromagnets. The stator is fixedly connected to the axle. The stator comprises the electromagnets. The rotor coaxially surrounds the stator. The first wheel bearing is arranged on the axle to rotatably connect the rotor to the axle. The lock nut is arranged on the axle. The axle has an engagement portion that is adapted to engage with an upright of the vehicle. The engagement portion is between the first wheel bearing and the lock nut. The lock nut is (Continued)

arranged to clamp the upright between the first wheel bearing and the lock nut.

12 Claims, 3 Drawing Sheets

(56) References Cited

U.S. PATENT DOCUMENTS

| | | | | |
|---|---|---|---|---|
| 6,955,474 | B2 * | 10/2005 | Barbiero | B60B 27/0089 |
| | | | | 384/537 |
| 10,536,051 | B2 * | 1/2020 | Michel | H02K 5/203 |
| 10,752,104 | B2 * | 8/2020 | Kawamura | H02K 7/085 |
| 11,641,146 | B2 * | 5/2023 | Yabuta | B60B 27/0005 |
| | | | | 310/75 R |
| 12,005,785 | B2 * | 6/2024 | Yada | F16J 15/10 |
| 2007/0257570 | A1 * | 11/2007 | Walter | B60K 7/0007 |
| | | | | 310/67 R |
| 2015/0008721 | A1 * | 1/2015 | Vogler | B60K 7/0007 |
| | | | | 301/6.5 |
| 2015/0231959 | A1 * | 8/2015 | Ishikawa | B60K 17/145 |
| | | | | 301/6.5 |
| 2016/0322926 | A1 * | 11/2016 | Dhawan | B60L 50/20 |
| 2017/0110933 | A1 * | 4/2017 | Michel | H02K 1/187 |
| 2019/0248225 | A1 * | 8/2019 | Kawamura | B60K 7/00 |
| 2020/0112229 | A1 * | 4/2020 | Yabuta | F16C 41/002 |
| 2020/0164735 | A1 * | 5/2020 | Van Der Wal | H02K 7/14 |
| 2020/0373806 | A1 * | 11/2020 | Nam | H02K 21/22 |
| 2021/0061095 | A1 * | 3/2021 | Galang | B60K 17/354 |
| 2021/0135539 | A1 * | 5/2021 | Remboski | H02K 7/116 |
| 2021/0178893 | A1 * | 6/2021 | Yang | B60K 7/0007 |

FOREIGN PATENT DOCUMENTS

| | | | | | |
|---|---|---|---|---|---|
| DE | 102013015911 | A1 * | 4/2014 | | F16C 33/805 |
| EP | 3008795 | B1 * | 5/2017 | | H02K 7/08 |
| WO | WO-2005102760 | A1 * | 11/2005 | | A61G 5/1054 |
| WO | WO-2009086884 | A1 * | 7/2009 | | B60K 7/0007 |
| WO | WO-2013047695 | A1 * | 4/2013 | | B60K 7/0007 |
| WO | WO-2015185874 | A1 * | 12/2015 | | H02K 5/20 |
| WO | WO-2019017788 | A1 * | 1/2019 | | H02K 5/203 |
| WO | WO-2019130904 | A1 * | 7/2019 | | B62K 25/20 |
| WO | WO-2019235203 | A1 * | 12/2019 | | B62M 7/12 |

OTHER PUBLICATIONS

Translated WO-2019130904-A1 (Year: 2024).*
Translated WO-2019235203-A1 (Year: 2024).*
Translated WO-2013047695-A1 (Year: 2025).*
Translated WO-2019235203-A1 (Year: 2025).*
Translated WO-2019130904-A1 (Year: 2025).*
International Search Report and Written Opinion dated Feb. 25, 2021, Application No. PCT/EP2021/052265.
Search Report and Written Opinion dated Aug. 17, 2020, Application No. NL2024835.

* cited by examiner

WHEEL ASSEMBLY, VEHICLE, AND METHOD OF ASSEMBLING

TECHNICAL FIELD OF THE INVENTION

The invention relates to a wheel assembly for a vehicle, in particular a wheel assembly comprising an in-wheel electric motor for a vehicle. The invention further relates to a vehicle comprising the wheel assembly. Further, the invention relates to a method for assembling the wheel assembly for the vehicle.

Acknowledgement

The project leading to this application has received funding from the European Union's Horizon 2020 research and innovation program under grant agreement No. 848620.

BACKGROUND OF THE INVENTION

An in-wheel motor (also known as a hub motor) is known to be used by the Aurora Solar Car Team in 1997 racing the World Solar Challenge in Australia and is described and shown in the thesis "Axial Flux Permanent Magnet Motor Csiro", R. Al Zaher, to be found in the repository of the Delft University of Technology, [-1-], more specifically FIGS. 4 and 5 right. This motor will further be referred to as the Csiro motor. The publication also shows an improved motor in its FIG. 5 left, which will be referred to as the improved Csiro motor.

It is noted that the motor is further developed by Marand Precision, see [-2-]. The Csiro motor, as well as the improved Csiro motor belong to a group of motors where the rotor coaxially surrounds the stator, so-called outrunner motors. The motor comprises permanent magnets attached to the rotor and electromagnets attached to the stator. The electromagnets in working generate a rotating magnetic field, that in interacting with the permanent magnets cause a torque on the rotor for propulsion. For this to happen, electric current must be fed to the electromagnets. The skilled person will recognize that the electrical conductors (cables) for exciting the electromagnets cannot pass through the rotor, but must pass through a part of the motor that is stationary to a part of the vehicle to which the motor is attached, the so-called upright.

To improve the mechanical efficiency of an in-wheel motor a wheel bearing with a small diameter should be used. This results in a lighter and compact design. More important is that a sealing with a small diameter should be used to reduce friction. It is noted that a sealing which is used to keep lubricant in a bearing shows much lower friction than a sealing used to keep dirt, dust and moisture from the environment out of the inner volume of the motor, having a IP5x rating or IP6x rating, where x is 7, 8 or 9. In the context of this patent application a dynamic sealing, sealing the inner volume from the environment is referred to as an environmental seal.

The Csiro motor and the improved Csiro motor solve the problem of feeding the electricity to the electromagnets while using a small wheel bearing by feeding the cables through a bore in the axle.

The Csiro motor and the improved Csiro motor resolve the problem of induced friction by the environmental sealing by refraining from using an environmental sealing for sealing the interior of the motor from the environment, and the internal parts of the Csiro motor and the improved Csiro motor are thus not sealed from the environment.

A disadvantage of this 'solution' is that it has a negative impact on the lifetime and robustness of the motor.

The Csiro motor shows a central axle with a relative thin wall, and an internal diameter that is in the middle larger than in the ends. A hole for passing the electric conductors from the bore in the axle to the electromagnets perforates the wall at a position where the internal diameter is at its largest.

Another disadvantage of this motor is that to produce such an axle with varying inner diameter is difficult, and results in an axle that lacks robustness. The same holds for the hole perforating the wall of the axle.

The improved Csiro motor shows only one wheel bearing (at the vehicle side of the motor) and passes the electric conductors through a straight bore. The wall of the axle is thicker and thus more robust.

Yet another disadvantage of both Csiro motors is that the wheel rim is integrated with the rotor. This means that when the tyre is punctured or otherwise needs to be exchanged, the tyre cannot easily be removed from the motor. This makes the motor less suitable for normal passenger vehicles.

Still another disadvantage of the Csiro motors is that they are not equipped with brakes.

It is noted that the Csiro motor and the improved Csiro motor are both so-called Axial Flux Permanent Magnet motors, as the magnetic flux between permanent magnets and electromagnets is in an axial direction. Motors with a radial flux orientation, the so-called Radial Flux Permanent Magnet motors, are also known, as are reluctance and induction motors.

It is noted that motors with solid axles are known from e.g. European patent publication EP3008795B1 to Protean Electric Limited, said motor showing a sealed inner volume and a small wheel bearing. The sealed inner volume improves the lifetime and robustness of the motor. However, the electric feedthroughs through the stator are placed at a diameter much larger than the outer diameter of the wheel bearing, necessitating a sealing with a large diameter and thus a large friction.

It is further noted that QS Motor shows a series of motors looking similar, for example its "13 inch 4000 W Single Shaft E-Max Hub Motor with removable rim", see http://www.qs-motor.com/product/new-13inch-3000w-8000w-single-shaft-hub-motor-withremovable-rim/[-3-]. However, these motors have two bearings, one on each side of the stator (as is the case for the Csiro motor), and necessarily a radial exit of cables through the wall of the axle from the central bore. This results in a less robust motor.

The known in-wheel motor is connected to the vehicle via an upright. The upright is a part that supports the wheel and connects the wheel to the suspension system of the vehicle. The upright transfers forces from the wheel to the suspension system. The upright is able to move up and down together with the wheel relative to the chassis of the vehicle. An upright that holds a steering wheel is in addition able to rotate along a vertical axis or an axis with a vertical component to allow steering of the vehicle.

SUMMARY OF THE INVENTION

A disadvantage of known wheel assemblies with the known in-wheel motors is that such a wheel assembly is heavy. A heavy wheel assembly creates a vehicle with a large unsprung mass. The large unsprung mass results in large forces on the wheel assembly, loss of grip and loss of comfort especially when driving over an uneven road.

It is an objective of the invention to reduce the weight of the wheel assembly, or at least to provide an alternative wheel assembly.

The objective of the invention is achieved by a wheel assembly for a vehicle, wherein the wheel assembly comprises:

an in-wheel motor;

an axle;

a first wheel bearing;

a lock nut; and wherein the in-wheel motor comprises a stator, a rotor and electromagnets, wherein the stator is fixedly connected to the axle, wherein the stator comprises the electromagnets, wherein the rotor coaxially surrounds the stator, wherein the first wheel bearing is arranged on the axle to rotatably connect the rotor to the axle, wherein the lock nut is arranged on the axle, characterized in that the axle has an engagement portion that is adapted to engage with an upright of the vehicle, wherein the engagement portion is between the first wheel bearing (114) and the lock nut, wherein the lock nut is arranged to clamp the upright between the first wheel bearing and the lock nut.

According to the wheel assembly of the invention, the first wheel bearing and the lock nut cooperate together to clamp the upright onto the axle. The upright is arranged on the axle at the engagement portion, which is between the first wheel bearing and the lock nut. The lock nut is arranged on the axle and extends radially outward of the axle. The first wheel bearing extends radially outward from the axle and forms a surface to which the upright can be clamped by the lock nut. By tightening the lock nut, the lock nut presses axially onto one side of the upright and thereby presses an opposite side of the upright onto the first wheel bearing. As a result, the axle does not need to have any axial surface onto which lock nut can clamp the upright. The axle can thus be made with less material, resulting in a wheel assembly with a reduced weight. In addition, the upright is placed 'cheek to cheek' to the inner bus of the wheel bearing which largely improves the bending stiffness of the wheel assembly.

The engagement portion is a part of the axle that, for example, fits through a hole in the upright. The hole in the upright, for example, determines the position of the upright relative to the axle. The hole in the upright is, for example, provided by a protrusion or a recess to determine an angular orientation of the upright relative to the axle. The engagement portion of the axle has, for example, a round cross-section, or a rectangular cross-section, or any other suitable cross-section that allows the engagement portion to engage with the upright. By tightening the lock nut, the upright slides, for example, along the axle until the upright comes into contact with the first wheel bearing. By further tightening the lock nut, the lock nut generates a clamping force that clamps the upright against the first wheel bearing, fixating the upright relative to the axle. In an example, a ring or a washer is arranged in between the upright and the first wheel bearing. The ring or washer slides along with the upright over the axle when tightening the lock nut, until the lock nut generates the clamping force. The ring or washer transfers the clamping force from the lock nut to the first wheel bearing.

The rotor is, for example, arranged to support a wheel rim. The wheel rim supports a tyre. Preferably, the wheel rim is removably attachable to the rotor, which allows for a more easy exchange of a tyre.

In an embodiment, the first wheel bearing is arranged between the engagement portion and the stator.

According to this embodiment, the first wheel bearing is arranged at the same side of the stator as the upright. Forces that are applied to the tyre, such as forces that are generated while steering the vehicle along a corner or forces generated by the weight of the vehicle, are transferred from the tyre via the rotor to the first wheel bearing, from the first wheel bearing to the upright, and via the upright to the chassis of the vehicle. By arranging the first wheel bearing and the upright on the same side of the stator, the path length of the forces that are transferred from the tyre to the chassis are minimized. As a result, the wheel assembly can be made smaller, and thus having less packaging volume, than known wheel assemblies.

In an embodiment, the lock nut is arranged to preload the first wheel bearing through the upright.

According to this embodiment, the lock nut is able to provide a clamping force to clamp the upright to the first wheel bearing and by doing so, preloading the first wheel bearing. So the clamping force to clamp the upright is also the preload force on the first wheel bearing. By preloading the first wheel bearing, different parts of the first wheel bearing are pressed together. For example, the first wheel bearing comprises rolling elements such as balls or rollers or needles, arranged in races. The rolling elements are able to move along the races when the rotor rotates relative to the axle. By preloading the first wheel bearing, the rolling elements are pushed into the races, reducing play between the rolling elements and the races, and increasing the stiffness of the first wheel bearing. By using the lock nut to preload the first wheel bearing, there is no need for any additional component to create the preload force.

In an embodiment, the wheel system comprises a second wheel bearing 214 located between the stator 102 and the first wheel bearing 114 (illustrated in FIGS. 3 and 4). The second wheel bearing is arranged on the axle to rotatably connect the rotor to the axle. The lock nut is arranged to preload both the first wheel bearing and the second wheel bearing.

According to this embodiment, both the first wheel bearing and the second wheel bearing are arranged on the axle and are connected to the rotor. This increases the stiffness and the strength of the connection between the axle and the rotor for rotation in a direction perpendicular to the axle. Such stiffness and strength helps when the vehicle is driving a sharp corner at a high speed. By preloading the second wheel bearing with the lock nut, the stiffness of the second wheel bearing is improved without adding much additional weight to the wheel assembly. The second wheel bearing does not need sealings (apart from, for example, lubricant sealings to keep lubricant in the second wheel bearing), in the example that protection against environmental influences is already being taken care of by the environmental sealing in the first wheel bearing.

Preferably, the first and second wheel bearings have the same inner and outer diameter, and are separated by a bus or ring, so that they fit on the same part of the axle and make a tight fit possible. In an example, the first and second wheel bearings are identical bearings.

In an embodiment, the first wheel bearing comprises a rolling element bearing having an inner ring, an outer ring and rolling elements. The outer ring radially encloses the inner ring. The rolling elements are arranged radially in between the inner ring and the outer ring. The inner ring is arranged on the axle. The outer ring is arranged on the rotor. The inner ring is deformable by the lock nut. The lock nut is arranged to preload the rolling elements onto the outer ring by deforming the inner ring.

According to this embodiment, the inner ring of the first wheel bearing deforms when the lock nut is tightened on the axle. For example, the inner ring has a flexible part that deforms when the lock nut applies the clamping force on the inner ring. In another example, the inner ring has openings, such as holes or slots, that partly or completely close when the lock nut applies the clamping force on the inner ring. When deforming, the inner ring pushes the rolling elements towards the outer ring. For example, the rolling elements are in contact with a race on the inner ring. The race is for example at an angle with the axle of 30 or 45 or 60 degrees. By tightening the lock nut along the axle, the race pushes against the rolling elements along that angle. The first wheel bearing is, for example, adapted to provide the most stiffness in the direction along the axle, wherein the angle is low, i.e., 0-45 degrees. In another example, the first wheel bearing is adapted to provide the most stiffness in the direction perpendicular to the axle, wherein the angle is high, i.e., 45-90 degrees.

In an embodiment, the inner ring has a first ring part and a second ring part. The rolling elements comprise two rows of rolling elements. The first ring part contacts one of the two rows. The second ring part contacts the other of the two rows. The lock nut is arranged to deform the inner ring by moving the first ring part and the second ring part relative to each other.

According to this embodiment, the lock nut is arranged to move the first ring part and the second ring part relative to each other by tightening the lock nut. For example, by tightening the lock nut, the lock nut pushes the first ring part and the second ring part towards each other. The first ring part pushes against one row of rolling elements, such as balls or rollers or needles. The rolling elements are arranged radially outward of the first ring part and in a plane perpendicular to the axle. The second ring part pushes against another row of rolling elements, such as balls or rollers or needles. The rolling elements are arranged radially outward of the second ring part and in a plane perpendicular to the axle. The two rows of rolling elements are at an offset from each other along the axle.

In an embodiment, the wheel assembly comprises a passage. The passage is through or over the axle. The rotor encloses an inner volume in which the stator is arranged. The passage is for accommodating electric conductors from the vehicle to the inner volume through the first wheel bearing. The wheel assembly comprises an environmental sealing between the rotor and the axle sealing the inner volume, preferably hermetically sealing the inner volume from the environment.

By providing the passage through or over the axle through the first wheel bearing, the in-wheel motor can be provided by electric power and electric signals via the electric conductors, while the environmental sealing prevents or at least reduces contamination from entering the inner volume. Hermetically sealing the inner volume from the environment means that the motor is resistant to dirt, dust and water and has a positive effect on lifetime and robustness. It is noted that in this context a hermetic sealing refers to a sealing forming a seal between the inner volume against the environment. This differs from sealing solely used to keep for example lubricant within a bearing.

To avoid leakage over or through the axle, the passage of the electric conductors through or over the axle is hermetically sealed. This may be achieved by, for example, adding a potting material in the bore after insertion of the electric conductors. To enable repair a putty may be used instead of a potting material.

In an embodiment, the environmental sealing is integrated in the first wheel bearing. By using an environmental sealing integrated in the first wheel bearing, the environmental sealing, that seals the inner volume from the environment, has a small diameter. The environmental sealing is integrated with the wheel bearing as this is the smallest diameter available in this design for an environmental seal. Any friction force caused by the environmental sealing is applied very close to the center of the axle, and, as a result, generates only a small friction torque. In comparison, the same friction force applied far away from the center of the axle would have generated a large friction torque.

Preferably the first wheel bearing shows only one environmental sealing located at a distal side of the axle (i.e., at the vehicle side), thereby protecting both the innards of the first wheel bearing and the inner volume of the motor from the environment. The distal side of the first wheel bearing is the side that faces away from the stator. The other side of the bearing, which in normal wheel bearings typically also shows a sealing to protect the innards of the bearing from the environment, is exposed to the inner volume of the motor and does not need an environmental sealing for sealing the inner volume from the environment.

It is noted that a lubricant sealing with low friction (low force) may be needed at that side to retain a lubricant (oil or grease) in the first wheel bearing, but as mentioned such a lubricant sealing does not need to cause high friction.

It is further noted that in Axial Flux or Radial Flux Permanent Magnet motors the gap between electromagnets and permanent magnets is a small gap, typically 1-2 mm. If any particles enter this gap damage to the brittle magnets or to magnet iron is likely to occur. Sealing occurs by one environmental sealing (causing friction) and one or more static sealings (that do not cause friction). Also, the formation of rust, or any other degradation of the materials should be avoided.

It is mentioned that a bore in an axle (thus resulting in a hollow cylinder) has little effect on the strength of the axle: the bending stiffness of such a cylinder compared to a solid cylinder is expressed by $S=1-(r/R)^4$ with S the relative bending stiffness, R the outer radius of the cylinder and r the radius of the bore (zero for a massive cylinder). If, for example, $r=R/2$, this results in $S=1-\frac{1}{16}$, a decrease of approximately 6%.

In an embodiment, the wheel assembly comprises the electric conductors and a connector. The axle has a distal end at a vehicle side of the wheel assembly. The electric conductors are connected to the connector. The connector is arranged at the distal end of the axle for connecting with the vehicle.

According to this embodiment, the connector is arranged at the side of the axle that is closest to the chassis of the vehicle. When mounting the wheel assembly to the upright of the vehicle, the connector can be easily connected to the vehicle to provide electric power and/or electric signals to the in-wheel motor via the electric conductors. The connector for connecting to the electrical conductors and/or wires reduces components and eases use.

In an embodiment, the connector has pins and is adapted to be mated to a contra-connector having corresponding pins. The axle is provided with a thread to cooperate with the lock nut. The contra-connector comprises a locking cap adapted to cooperate with the thread.

According to this embodiment, the contra-connector is supported via the locking cap to the same thread on which the lock nut is arranged. This way, no separate support structure is needed to hold the contra-connector, which would add additional space to the unsprung mass of the vehicle. This embodiment also allows for an easy connection between the connector and the contra-connector. By using the same thread for the locking nut and for attaching a contra-connector (by screwing), the number of components, and therefore price, is reduced still further while ease of use is further increased, and volume is reduced as well.

In an embodiment, the electric conductors pass within the first wheel bearing via one or more bores through the axle and/or one or more grooves on the axle.

According to this embodiment, the axle has bores or grooves through which the electric conductors run. The electric conductors are thus enclosed by the axle or by the grooves in the axle and the inner part of the wheel bearing. Although a groove slightly weakens the axle as it removes material from the outer diameter of the axle, it leads to a simple mounting of the electric conductors.

In an example, in addition or alternatively to the electric conductors, a cooling channel, such as a hose or a tube, can be mounted likewise. To maintain a temperature in the in-wheel motor where all components, such as electromagnets and for example permanent magnets, can work safely, cooling by a fluid (either liquid or gas) may be necessary. Cooling energy is useful for other purposes in the vehicle, such as cabin heating and temperature control of Li-ion batteries, and this is best achieved by a system incorporating a channel for fluid cooling.

It is noted that a heat pipe and the like also use a fluid and are expressly included in this example.

It is further noted that the fluid may be enclosed by a tube, the tube positioned in the channel, or the fluid may be in direct contact with the channel, the channel being part of the axle.

Making the channel a part of the axle and/or stator results in less parts and connections and therefore less chance of leakage. It enables the use of a small axle diameter while retaining the stiffness of the axle by adding material (for the same inside diameter of the channel). It also slightly improves the heat transfer since the full axle and stator are cooled.

It is noted that as a bonus of guiding the electric conductors through the axle, the electric conductors are also shielded by the axle material, typically a reasonably well conducting material, such as steel. If needed a conductive coating, for example a copper coating, may be used on the axle to improve (surface) conductivity of the bore or bores.

In an embodiment, the wheel assembly comprises one or more relief valves to avoid the build-up of underpressure or overpressure in the inner volume.

According to this embodiment, due to sealing or hermetically sealing of the inner volume of the wheel assembly changes in temperature (due to, among others, motor dissipation) and/or environmental pressure, can cause an overpressure or underpressure in the inner volume with respect to the environment. This pressure difference may result in damage of the environmental sealing, or damage to other parts of the wheel assembly. Also, the friction can vary depending on the pressure difference. To avoid this, one or more relief valves, if needed with filter (for example a molecular sieve) may be used. As an example, one relief valve may relief an overpressure of the inner volume, while another relief valve may act to relief underpressure of the inner volume. In another example, a single relief valve is adapted to relief an overpressure and an underpressure of the inner volume.

It is noted that the friction of an environmental sealing is typically dependent on the maximum pressure difference the sealing has to withstand: a large pressure difference implies a robust sealing with a large friction. Typical wheel bearings include a sealing that can withstand up to 0.3-0.5 bar, typically up to 0.25 bar pressure difference.

It is noted that this use of relief valves for a sealed motor may also be used for motors without a hollow axle, and is not even limited to in-wheel motors, but is applicable to all motors that have a hermetically sealed volume.

In an embodiment, the wheel assembly comprises a brake disk of a disk brake mounted on the rotor.

According to this embodiment, use is made of a disk brake. The brake disk is arranged on the rotor. The calipers of the disk brake are arranged on the stator or on the upright. The calipers cooperate with the brake disk to dissipate energy from the rotor by clamping the brake disk to create a friction force between the calipers and the brake disk. In an alternative embodiment, use is made of a drum brake, wherein the drum is arranged on the rotor.

In an embodiment, the in-wheel motor is a motor from the group of Axial Flux Permanent Magnet motors, Radial Flux Permanent Magnet motors, induction motors, and reluctance motors.

In a further aspect of the invention, there is provided a vehicle equipped with a wheel assembly according to one of the mentioned embodiments and comprising the upright.

In an embodiment, the upright comprises a steel portion. The lock nut is arranged to preload the first wheel bearing through the steel portion.

According to this embodiment, the clamping force that is provided by the lock nut is transferred via the steel portion of the upright to the first wheel bearing. The steel portion of the upright is able to withstand the large stress caused by the clamping force. For example, the clamping force is in the range of 50-150 kN, for example 70-120 kN to provide sufficient preload on the first wheel bearing. By providing a steel portion, it is prevented that the upright is plastically deformed by the clamping force. Other parts of the upright, which are not subjected to the clamping force, are for example made from other materials than steel, such as aluminum. In an example, the complete upright is made of steel.

In yet another aspect of the invention, there is provided a method for assembling a wheel assembly for a vehicle, the method comprising:

providing an in-wheel motor comprising a stator, a rotor and electromagnets, wherein the stator comprises the electromagnets, and wherein the rotor coaxially surrounds the stator;

fixing the stator to an axle;

rotatably connecting the rotor to the axle by arranging a first wheel bearing on the axle arranging the lock nut on the axle, arranging an upright on the axle in between the first wheel bearing and a lock nut, and tightening the lock nut to clamp the upright between the first wheel bearing and the lock nut.

In an embodiment, the method comprises arranging the first wheel bearing between the upright and the stator before tightening the lock nut.

In an embodiment, the method comprises preloading the first wheel bearing with the lock nut through the upright.

BRIEF DESCRIPTION OF THE DRAWINGS

The invention is now elucidated using figures, in which identical reference signs indicate corresponding features. To that end.

DETAILED DESCRIPTION OF THE INVENTION

Figure 1:
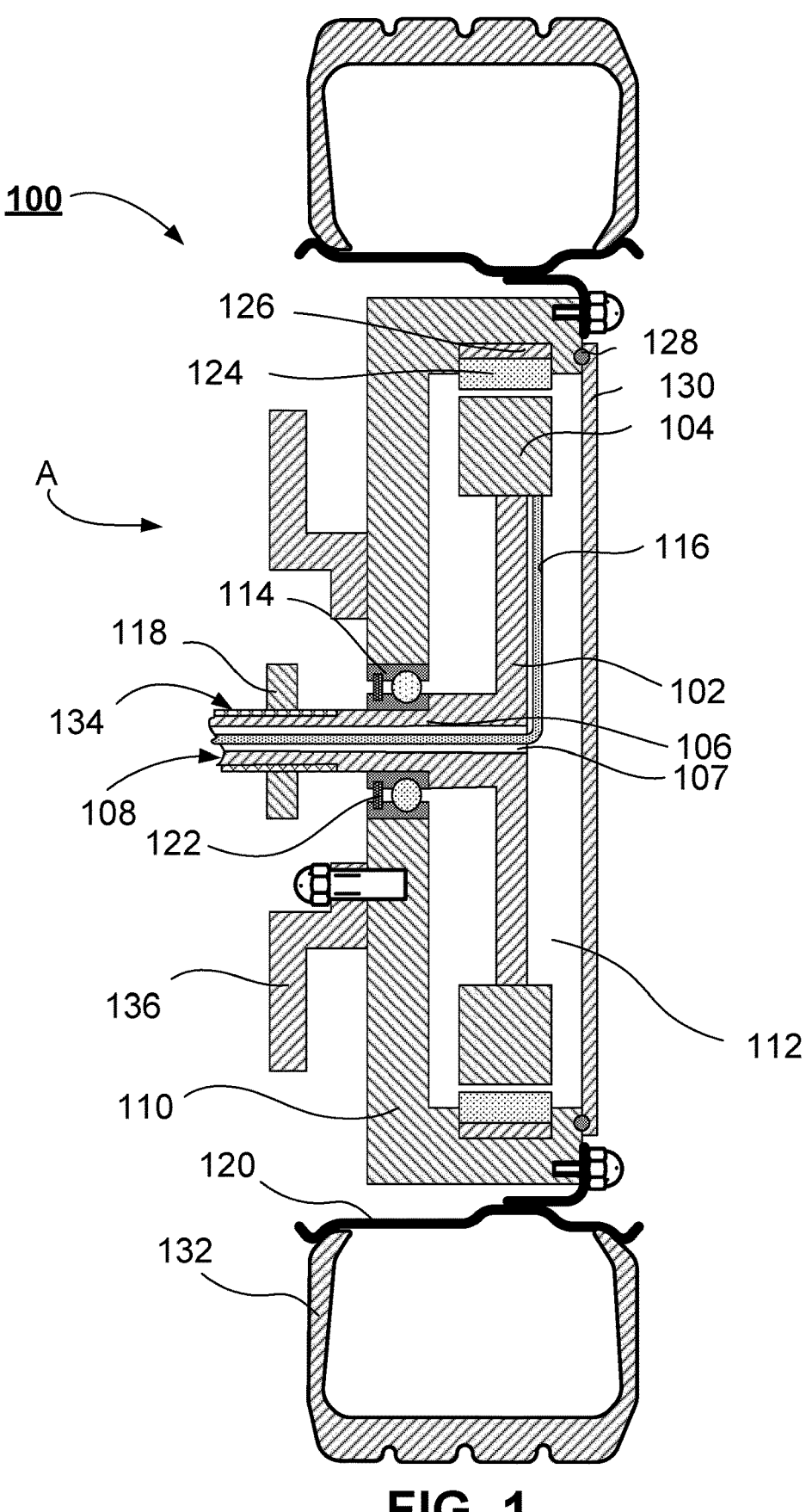
FIG. 1 schematically shows an in-wheel motor according to the invention.

FIG. 1 schematically shows an in-wheel motor for a vehicle. The in-wheel motor 100 shows a stator 102 with electromagnets 104. An axle 106 is fixedly connected to the stator 102, the axle 106 showing a distal end 108 at the vehicle side (A). To be fixedly connected the stator 102 and the axle 106 may be machined from a single part, or they may for example be welded, soldered, or the like. A rotor 110 coaxially surrounds the stator 102 and encloses an inner volume 112 where the stator 102 resides. The motor 100 comprises a first wheel bearing 114 radially positioned between the rotor 110 and the axle 106 and axially positioned between the stator 102 and the distal end 108. The wheel bearing 114 shows an integrated environmental sealing 122 between the rotor 110 and the stator 102 for sealing the inner volume 112 of the motor 100 from the environment. One or more electric conductors 116 and/or cooling conduits pass through bore 107 to the inner volume 112. The electric conductors 116 feed power to the electromagnets 104 (shown) or internal electronics (not shown). Preferable the electric conductors 116 are cables, but busbars can be used as well. The motor 100 further shows a lock nut 118 that is screwed on thread 134 and a wheel rim 120. Wheel rim 120 is for carrying a tyre 132 and is removably connected to the rotor 110 to enable exchange of a tyre 132 on the wheel rim 120 without completely disassembling the motor 100.

On the rotor 110, a disk 136 of a brake disk is mounted to enable (mechanical) breaking.

It is noted that also the electromagnets 104 may be equipped with a back-iron, taking the form of a hollow cylinder (a bus) at the axle 106 side of the electromagnets 104.

The stator 102 preferably has a number of electromagnets 104 different from the number of permanent magnets 124 of the rotor 110. The permanent magnets 126 are attached to a back-iron 126. By applying a three-phase electric signal to the electromagnets 104, a rotating magnetic field is generated. The interaction of the rotating magnetic field together with the magnetic field of the permanent magnets 124 causes a torque between rotor 110 and stator 102. This torque is then transferred to the road and causes propulsion for the vehicle. Efficiency of such a motor is well above 90%, that is: in normal use less than 10% of the applied electric power is dissipated in heat, and most of it is transferred in mechanic power transferred to the road. Therefore the amount of heat that must be dissipated is limited, but often forced cooling using a fluid, preferably a liquid, to be transferred to a radiator or used to control (heat) the temperature of the interior of the vehicle and/or batteries. This to overcome overheating of permanent magnets 124 and the coils of the electromagnets 104.

The electric conductors 116, for example busbars or cables, are guided through bore 107 of the axle 106. This can be one common bore, or a number of separate bores.

If applicable, also two channels for cooling (one channel going in, one going out) are guided through the axle 106. The fluid may be transported in a tube that is inserted in a bore, or the bore may be part of the piping through which the fluid is transported. In the latter case, the tubing may contact the axle 106 with, for example, nipples. As an alternative the channel for the fluid may be integrated in (the material of) the stator 102.

The first wheel bearing 114 has an environmental sealing 122 sealing the internal volume 112 from the environment. If needed the first wheel bearing 114 also comprises a lubricant sealing to keep the wheel bearing lubricated. This sealing is located between the bearing balls of the first wheel bearing 114 and the inner volume 122 of the motor 100. This sealing does not need to protect the first wheel bearing 114 against the ingress of dirt and water and can thus be of a much lighter type of sealing that shows much less friction.

Apart from the sealings caused by environmental sealing 122 and static sealing 128 between the lid 130 and the rotor 110, also the bores through the axle need to be sealed off (sealing not shown). This sealing can be done by filling, for example, the bore with a resin, or by sealing the conductors in the bore(s) using, for example, O-rings.

It is noted that, apart from the three electric conductors 116 for supplying power and optionally the cooling channels, preferably one or more data channels are present to measure for example for speedometer, sensor for determining relative position of electromagnets and permanent magnets, temperature measurement etc. in the motor and make these signals known to the vehicle.

It may seem that only little is gained when improving the efficiency of a motor that already has such a high efficiency, for example improving it from 90% to 95%. However, it means that mechanical losses are almost halved. It also means that less heat is produced in the motor, possibly making forced cooling using a fluid obsolete or greatly simplifying it. As an alternative, it makes a larger power available in the same packaging (volume).

Between the lock nut 118 and the wheel bearing 114 a (part of an) upright of the vehicle may be present, thereby attaching the motor to the vehicle. If needed a hollow cylinder may be inserted between the upright and the first wheel bearing 114 to adjust the distance between upright and motor.

The distal end can be formed as a connector with pins (preferably male pins), to be mated with a contra-connected comprising pins (preferably female pins on the vehicle side as the vehicle is the source of a dangerous voltage). The connector may share the thread of the distal end of the axle (also used by the lock nut). Also, a (low power/low voltage) data channel (for speedometer, sensor for determining relative position of electromagnets and permanent magnets, temperature measurement etc.) is preferably included.

The temperature of the inner volume 112 varies when the dissipated power changes, thereby causing a differing pressure in the inner volume 112. Also, the pressure of the environment may change due to changing weather and/or different heights (when driving uphill or downhill). The resultant pressure difference exerts large forces on, for example, lid 130 and the sealing integrated in the first wheel bearing 114. To avoid this preferable the motor also comprises one or more relief valves to avoid overpressure or underpressure. The relief valve(s) can be mounted on the rotor or on the axle, penetrating the bore at a position where the bore is in non-hermetic contact with the inner volume 112. Two one-directional relief valves may be used, one for overpressure and one for underpressure, or a bi-directional valve may be used.

Figure 2A:
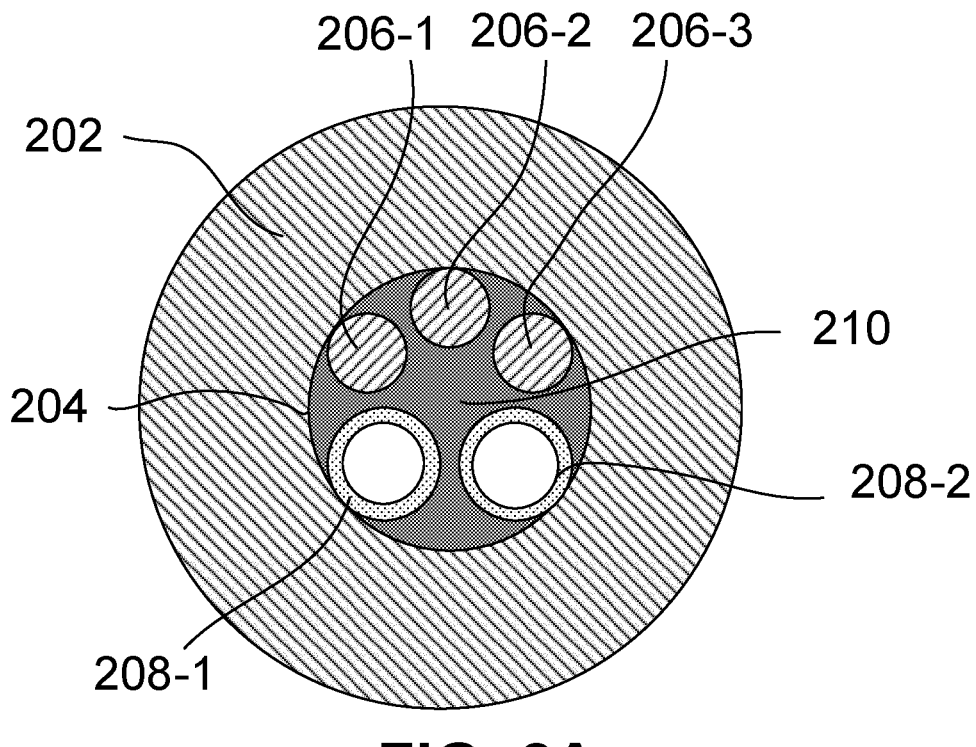
FIG. 2A schematically shows a cross-section of an axle with bores.
Figure 2B:
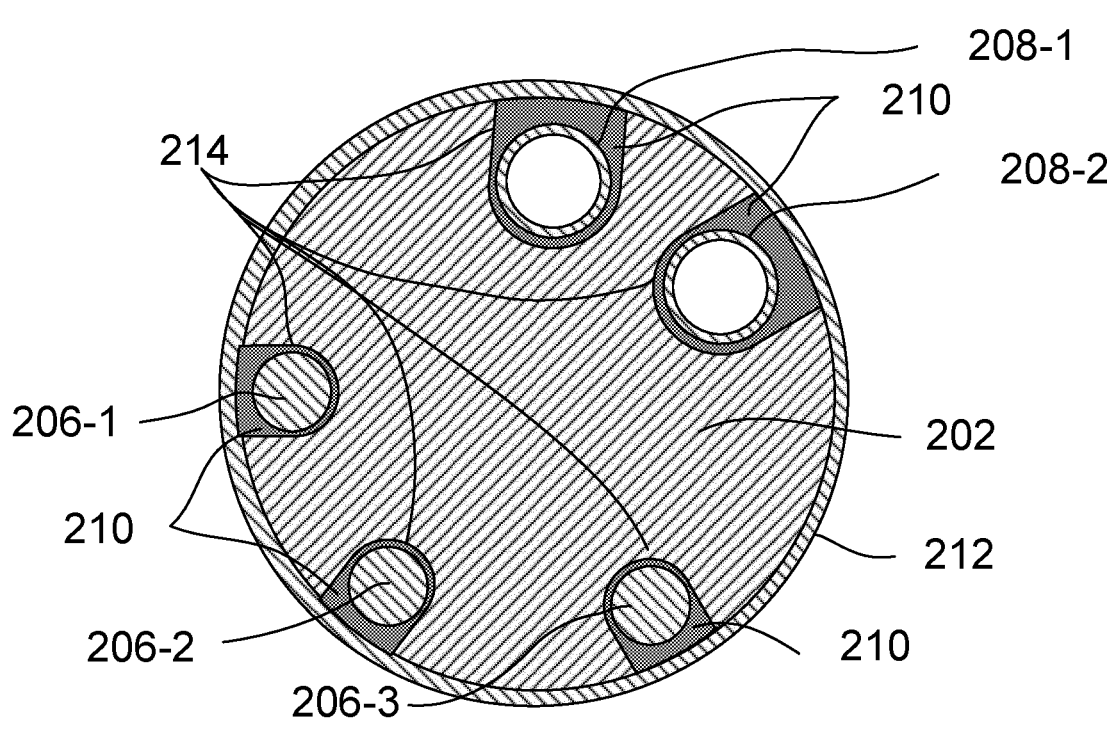
FIG. 2B schematically shows a cross-section of an axle with grooves.

FIG. 2A and FIG. 2B schematically show a cross-section of two different forms of axles according to the invention.

FIG. 2A shows an axle 202 with a bore 204. In the bore conductors in the form of cables 206-1, 206-2 and 206-3 are inserted. Further fluid channels 208-1 and 208-2 are shown. To seal the bore, sealant 210, for example an epoxy, fills the space between the electric conductors and the channels.

FIG. 2B schematically shows an axle 202 with grooves 214. In the grooves 214 the cables 206-1, 206-2 and 206-3 are fixed by, for example, an epoxy 210. Also two coolant channels 208-1 and 208-2 are inserted on grooves 214. A metal cylinder 212 surrounds the axle and epoxy fillings to offer a homogeneous and smooth surface. The cylinder can be fixed to the axle by, for example, the epoxy and/or by crimping, spot-welding or the like.

For extra bending stiffness of the axle, the lock nut (118) presses the upright of the vehicle directly 'cheek to cheek' to the wheel bearing, and for ease of use the motor is preferably equipped with a connector on the distal end (108) of the axle.

Figure 3:
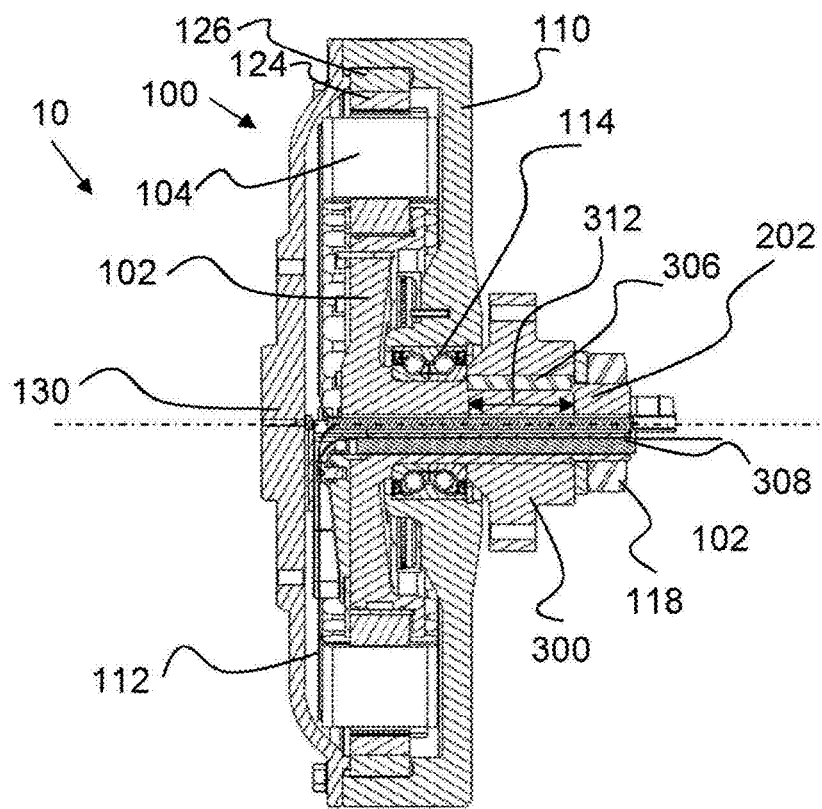
FIG. 3 schematically shows a cross-section of a further embodiment of the invention, and FIG. 4 schematically shows a detail of the cross-section of FIG. 3.

FIG. 3 schematically shows a further embodiment according to the invention. This embodiment has, for example, the same features as the embodiment of FIG. 1 or the same features as the embodiment of FIG. 2. FIG. 3 shows a wheel assembly 10 for a vehicle. The wheel assembly 10 comprises an in-wheel motor 100, an axle 202, a first wheel bearing 114, and a lock nut 118. The in-wheel motor 100 comprises a stator 102, a rotor 110 and electromagnets 104. The in-wheel motor 100 further comprises permanent magnets 124 that cooperate with the electromagnets 104 to generate an electromagnetic force to drive the in-wheel motor 10 by rotating the rotor 110 relative to the stator 102. The stator 102 is fixedly connected to the axle 202. The stator 102 comprises the electromagnets 104. The rotor 110 coaxially surrounds the stator 102 and forms an inner volume 112 in which the stator 102 is arranged. The first wheel bearing 114 is arranged on the axle 202 to rotatably connect the rotor 110 to the axle 202. The lock nut 118 is arranged on the axle 202. The axle 202 has an engagement portion 312. The engagement portion 312 is adapted to engage with an upright 300 of the vehicle. The engagement portion 312 is indicated by the double sided arrow extending along the axle 202. The engagement portion 312 has the width of the upright 300. The engagement portion 312 is between the first wheel bearing 114 and the lock nut 118. The lock nut 118 is arranged to clamp the upright 300 between the first wheel bearing 114 and the lock nut 118.

The inner volume 112 is constrained on the left side of the figure by lid 130. The distal end side of the inner volume 112 is constrained by the rotor 110, whereas the opposite side is constrained by the lid 130. The lid 130 helps to prevent contamination from entering the inner volume 112. The static sealing 128 is arranged between the rotor 110 and the lid 130, but is not shown in the figure. The lid 130 has a thickness to provide mechanical strength to help to protect the in-wheel motor inside the inner volume 112. In case of an accident, the mechanical strength of the lid 130 helps to prevent that an object collides with the in-wheel motor 100, which would cause damage to the in-wheel motor 100.

The first wheel bearing 114 is arranged between the engagement portion 312 and the stator 102. The lock nut 118 is arranged to preload the first wheel bearing 114 through the upright 300. This is shown in more detail in FIG. 4.

Figure 4:
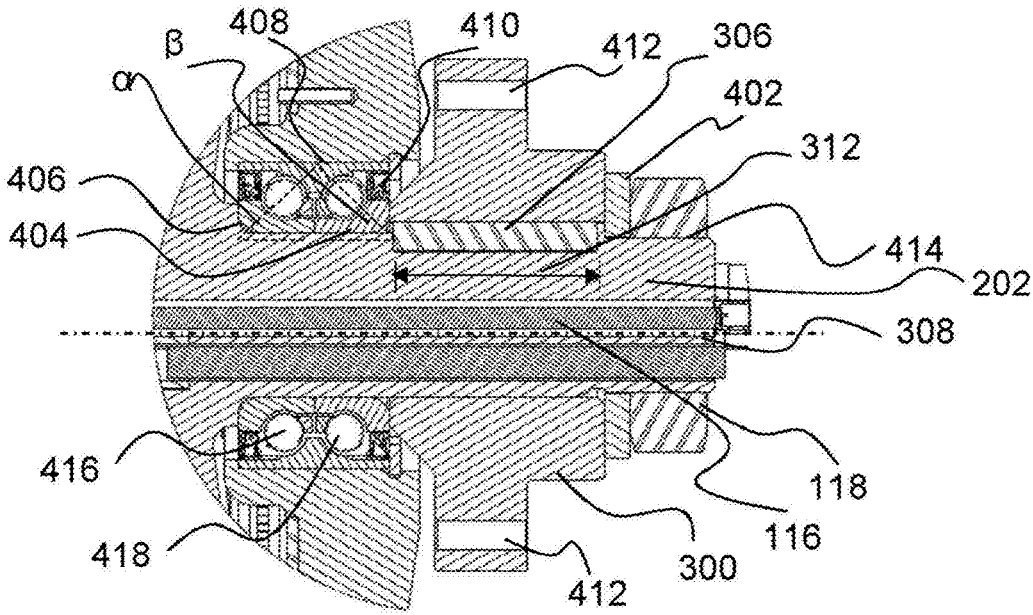

FIG. 4 shows that the upright 300 is arranged on the engagement portion 312 of the axle 202 between the first wheel bearing 114 and the lock nut 118. To prevent damage to the upright 300 when tightening the lock nut 118, a washer 402 is arranged between the lock nut 118 and the upright 300. When tightening the lock nut 118, the lock nut 118 provides a clamping force through the washer 402 to the upright 300 to press the upright 300 against the first wheel bearing 114. The axle 202 is provided with an axial surface to constrain the first wheel bearing 114 at the left side of the first wheel bearing 114 as shown in the figure. The axle 202 is provided with a key slot in the engagement portion 312 to accommodate an axle key 306. The axle key 306, alternatively referred to as peg or pin, is inserted in the key slot and radially extends from the axle 202. The upright 300 has a slot to receive the part of the axle key 306 that radially extends from the axle 202. The axle key 306 sets the rotational orientation of the axle 202 relative to the upright 300. The upright 300 has multiple mounting holes 412 to accommodate bolts to bolt the upright 300 to the suspension system of the vehicle.

In this embodiment, the first wheel bearing 114 is a rolling element bearing having an inner ring, an outer ring 408 and rolling elements. The inner ring has a first ring part 404 and a second ring part 406. The rolling elements are steel balls or ceramic balls. The outer ring 408 radially encloses the inner ring. The rolling elements are arranged radially in between the inner ring and the outer ring. The inner ring is arranged on the axle. The outer ring 408 is arranged on the rotor 110. The inner ring is deformable by the lock nut 118. The lock nut 118 is arranged to preload the rolling elements to the outer ring 408 by deforming the inner ring.

To preload the inner ring, the inner ring has the first ring part 404 and the second ring part 406. The rolling elements comprise two rows 416, 418 of rolling elements. Each of the rows 416, 418 of rolling elements are arranged radially around the axle 202. The rows 416, 418 are at an offset from each other along the direction of the axle 202. The first ring part 404 contacts one of the two rows, i.e., row 416. The second ring part 406 contacts the other of the two rows, i.e., row 418. The lock nut 118 is arranged to deform the inner ring by moving the first ring part 404 and the second ring part 406 relative to each other. When the lock nut 118 is not tightened yet, there is a small axial opening between the first ring part 404 and the second ring part 406. When tightening the lock nut 118, the opening between the first ring part 404 and the second ring part 406 becomes smaller. The lock nut 118 deforms the inner ring by closing or reducing the axial opening between the first ring part 404 and the second ring part 406.

The first ring part 404 has a race that pushes against the rolling elements in the row 416 under an angle $\alpha$. The outer ring 408 has a race that pushes on the diametrical side of the rolling elements of row 416. The second ring part 406 has a race that pushes against the rolling elements in the row 418 under an angle $\beta$. The outer ring 408 has another race that pushes on the diametrical side of the rolling elements of row 418.

The passage 308 accommodates the electric conductors 116 from the vehicle to the inner volume 112 through the first wheel bearing 114. An environmental sealing 410 is arranged between the rotor 110 and the axle 202 to seal the inner volume 112. The environmental sealing 410 is integrated in the first wheel bearing 114. The passage 308 is through the axle 202.

As required, this document describes detailed embodiments of the present invention. However it must be understood that the disclosed embodiments serve exclusively as examples, and that the invention may also be implemented in other forms. Therefore specific constructional aspects which are disclosed herein should not be regarded as restrictive for the invention, but merely as a basis for the claims and as a basis for rendering the invention implementable by the average skilled person.

Furthermore, the various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

Cited Non-Patent Literature

[-1-] "Axial Flux Permanent Magnet Motor Csiro", R. Al Zaher, thesis, 4 Apr. 2010, repository of Delft University of Technology, https://repository.tudelft.nl/islandora/object/uuid:029674d0-3844-4b92-be6d-90bdcc4b9dad/datastream/OBJ/download
[-2-] Marand Precision Pty Ltd, see: https://renew.org.au/wp-content/uploads/2018/12/marand_high_efficiency_motor.pdf
[-3-] "13 inch 4000 W Single Shaft E-Max Hub Motor with removable rim", QS Motor, see http://www.qs-motor.com/product/13inch-3000w-single-shaft-hub-motor-v3-type/

The invention claimed is:

1. A wheel assembly for a vehicle, the wheel assembly comprising:
an in-wheel motor;
an axle;
a first wheel bearing; and
a lock nut;
wherein the in-wheel motor comprises a stator, a rotor and electromagnets,
wherein the stator is fixedly connected to the axle,
wherein the stator comprises the electromagnets,
wherein the rotor coaxially surrounds the stator,
wherein the first wheel bearing is arranged on the axle to rotatably connect the rotor to the axle,
wherein the lock nut is arranged on the axle,
wherein the axle has an engagement portion that is adapted to engage with an upright of the vehicle,
wherein the engagement portion is between the first wheel bearing and the lock nut, wherein the lock nut is arranged to clamp the upright between the first wheel bearing and the lock nut,
wherein the lock nut is arranged to preload the first wheel bearing,
wherein the first wheel bearing is in direct contact with the upright on one side; and
wherein the first wheel bearing is in direct contact with the stator on the opposite side.

2. The wheel assembly according to claim 1, wherein the first wheel bearing is arranged between the engagement portion and the stator.

3. The wheel assembly according to claim 1, wherein the lock nut is arranged to preload the first wheel bearing through the upright.

4. The wheel assembly according to claim 1, wherein the first wheel bearing comprises a rolling element bearing having an inner ring, an outer ring and rolling elements, wherein the outer ring radially encloses the inner ring, wherein the rolling elements are arranged radially in between the inner ring and the outer ring, wherein the inner ring is arranged on the axle, wherein the outer ring is arranged on the rotor, wherein the inner ring is deformable by the lock nut, wherein the lock nut is arranged to preload the rolling elements to the outer ring by deforming the inner ring.

5. The wheel assembly of claim 4, wherein the inner ring has a first ring part and a second ring part, wherein the rolling elements comprise two rows of rolling elements, wherein the first ring part contacts one of the two rows, wherein the second ring part contacts the other of the two rows, wherein the lock nut is arranged to deform the inner ring by moving the first ring part and the second ring part relative each other.

6. The wheel assembly according to claim 1, comprising a passage,
wherein the rotor encloses an inner volume in which the stator is arranged,
wherein the passage is for accommodating electric conductors from the vehicle to the inner volume through the first wheel bearing,
wherein the wheel assembly comprises an environmental sealing between the rotor and the axle sealing the inner volume,
wherein the passage is through or over the axle.

7. The wheel assembly according to claim 6, wherein the environmental sealing is integrated in the first wheel bearing.

8. The wheel assembly according to claim 6, wherein the electric conductors pass within the first wheel bearing via a bore through the axle or one or more grooves on the axle.

9. The wheel assembly according to claim 1, comprising a brake disk of a disk brake mounted on the rotor.

10. The wheel assembly according to claim 1, wherein the in-wheel motor is a motor from the group of Axial Flux Permanent Magnet motors, Radial Flux Permanent Magnet motors, induction motors, and reluctance motors.

11. A vehicle equipped with the wheel assembly according to claim 1 and comprising the upright.

12. The vehicle of claim 11, wherein the upright comprises a steel portion, wherein the lock nut is arranged to preload the first wheel bearing through the steel portion.

* * * * *